US012672022B2

(12) United States Patent
Gopala et al.

(10) Patent No.: US 12,672,022 B2
(45) Date of Patent: Jun. 30, 2026

(54) META VERSE OPTIMIZATION AND PRIORITIZATION SYSTEM AND METHOD THEREFOR

(71) Applicant: Meta Platforms, Inc., Menlo Park, CA (US)

(72) Inventors: Praveen Kumar Gopala, Danville, CA (US); Krishna Srikanth Gomadam, San Jose, CA (US); Po-Han Huang, The Woodlands, TX (US)

(73) Assignee: Meta Platforms, Inc., Menlo Park, CA (US)

( * ) Notice: Subject to any disclaimer, the term of this patent is extended or adjusted under 35 U.S.C. 154(b) by 333 days.

(21) Appl. No.: 18/375,502

(22) Filed: Sep. 30, 2023

(65) Prior Publication Data

US 2025/0113238 A1    Apr. 3, 2025

(51) Int. Cl.
*H04W 28/02* (2009.01)
*H04L 41/0631* (2022.01)
(Continued)

(52) U.S. Cl.
CPC ..... *H04W 28/0231* (2013.01); *H04L 41/0631* (2013.01); *H04L 41/5067* (2013.01); *H04W 84/12* (2013.01)

(58) Field of Classification Search
CPC .............. H04W 28/0231; H04W 84/12; H04L 41/0631; H04L 41/5067
See application file for complete search history.

(56) References Cited

U.S. PATENT DOCUMENTS 9,872,242 B2    1/2018   Xiao et al.
10,116,371 B2   10/2018  Park et al.
(Continued)

FOREIGN PATENT DOCUMENTS

WO    WO-2023081376 A1 *  5/2023   ........... H04L 5/0057

OTHER PUBLICATIONS

Cavalcanti D., et al., "Extending Accurate Time Distribution and Timeless Capabilities over the Air to Enable Future Wireless Industrial Automation Systems," Proceedings of the IEEE, Jun. 2019, vol. 107, No. 6, 21 pages.
(Continued)

*Primary Examiner* — Kenny S Lin
(74) *Attorney, Agent, or Firm* — EVERSHEDS SUTHERLAND (US) LLP

(57) ABSTRACT

In some embodiments, a metaverse optimization and prioritization enabled cloud-based controller includes a metaverse traffic classification unit; and a metaverse optimization and prioritization unit, wherein based upon the identification and classification of data packets as metaverse data packets, the metaverse optimization and prioritization unit optimizes and prioritizes a metaverse client device and metaverse traffic associated with a metaverse optimization and prioritization enabled network. In some embodiments, the metaverse optimization and prioritization unit optimizes the metaverse client device based upon a quality of experience associated with the metaverse client device. In some embodiments, the metaverse optimization and prioritization unit prioritizes the metaverse traffic based on quality of service management features ascertained utilizing the metaverse optimization and prioritization enabled cloud-based controller.

18 Claims, 5 Drawing Sheets

(51) Int. Cl.
    *H04L 41/5067*    (2022.01)
    *H04W 84/12*    (2009.01)

(56) References Cited

U.S. PATENT DOCUMENTS

| | | | |
|---|---|---|---|
| 10,355,938 B2 | 7/2019 | Saha et al. | |
| 10,439,909 B2 | 10/2019 | Mordani et al. | |
| 10,499,333 B2 | 12/2019 | Asterjadhi et al. | |
| 10,757,076 B2 | 8/2020 | Khare et al. | |
| 10,797,960 B2 | 10/2020 | Zavesky et al. | |
| 10,880,920 B2 | 12/2020 | Finkelstein | |
| 10,897,474 B2 | 1/2021 | Anderson et al. | |
| 10,924,392 B2 | 2/2021 | Shenoy | |
| 11,051,320 B1 * | 6/2021 | Siraj | H04L 47/803 |
| 11,102,740 B2 | 8/2021 | Gidvani et al. | |
| 11,252,656 B2 | 2/2022 | Ergen | |
| 11,350,307 B2 | 5/2022 | Boyapalle et al. | |
| 11,510,027 B2 | 11/2022 | Lundmark | |
| 11,516,139 B2 | 11/2022 | Ismailsheriff et al. | |
| 11,943,820 B2 * | 3/2024 | John | H04W 76/10 |
| 12,238,010 B2 * | 2/2025 | Sang | H04L 47/2475 |
| 2015/0312157 A1 | 10/2015 | Liu | |
| 2016/0295579 A1 * | 10/2016 | Pham | H04W 28/24 |
| 2017/0126476 A1 | 5/2017 | Curtin et al. | |
| 2017/0185466 A1 * | 6/2017 | Zhao | G06F 11/0751 |
| 2017/0272485 A1 * | 9/2017 | Gordon | H04N 21/8456 |
| 2018/0046510 A1 * | 2/2018 | Boss | G06F 11/3017 |
| 2018/0212885 A1 | 7/2018 | Contavalli et al. | |
| 2019/0041976 A1 * | 2/2019 | Veeramani | G06F 3/011 |
| 2020/0259731 A1 * | 8/2020 | Sivaraman | H04L 43/026 |
| 2021/0204152 A1 * | 7/2021 | Vasudevan | G06N 3/0475 |
| 2021/0211316 A1 | 7/2021 | Raleigh et al. | |

| | | | |
|---|---|---|---|
| 2021/0250963 A1 | 8/2021 | Seok et al. | |
| 2021/0409999 A1 | 12/2021 | Chilla et al. | |
| 2022/0116329 A1 | 4/2022 | Panje et al. | |
| 2022/0124039 A1 | 4/2022 | Chandra et al. | |
| 2022/0124548 A1 | 4/2022 | Srivastava et al. | |
| 2022/0124560 A1 | 4/2022 | Yeh et al. | |
| 2022/0174638 A1 | 6/2022 | Oduwaiye et al. | |
| 2022/0200924 A1 | 6/2022 | Lu et al. | |
| 2022/0248247 A1 | 8/2022 | Wei et al. | |
| 2022/0255988 A1 | 8/2022 | Salmasi | |
| 2022/0303907 A1 | 9/2022 | Shafin et al. | |
| 2023/0199544 A1 * | 6/2023 | Karlsson | H04W 28/0226 370/329 |
| 2023/0216760 A1 * | 7/2023 | Nguyen | H04L 67/535 |
| 2024/0113933 A1 * | 4/2024 | Sridhar | H04L 41/0636 |
| 2024/0291764 A1 * | 8/2024 | Sang | H04L 47/2441 |
| 2025/0193096 A1 * | 6/2025 | Sinha | H04L 47/2441 |

OTHER PUBLICATIONS

Queiroz W., "Big Data for Traffic Engineering in Software-Defined Networks," Electronic Thesis and Dissertation Repository 6147, Apr. 23, 2019, 124 pages, Retrieved from the Internet: URL: https://ir.lib.uwo.ca/etd/6147.

Szigeti T., et al., "Mapping Diffserv to IEEE 802.11," Internet Engineering Task Force, RFC 8325, Feb. 2018, 37 pages.

Wifi Alliance., "Analyzing Operator QoS Deployment Scenarios between Wi-Fi and 5G," Sep. 2022, 9 pages.

Wifi Alliance, "Wi-Fi QoS Management," [Retrieved on Feb. 14, 2023], 2 pages, Retrieved from the Internet: URL: 5 https://www.wi-fi.org/discover-wi-fi/wi-fi-qos-management.

* cited by examiner

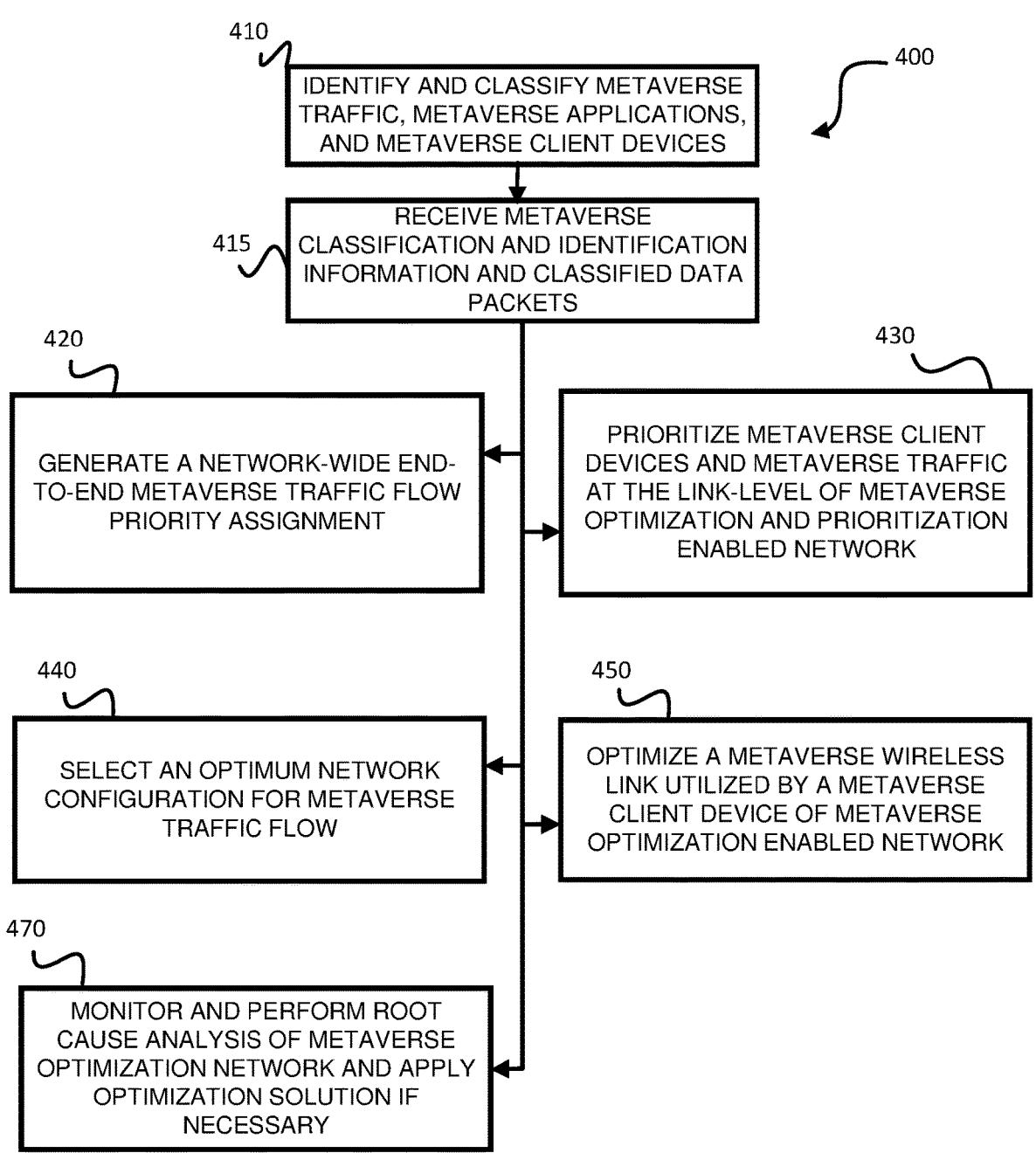

410

IDENTIFY AND CLASSIFY METAVERSE
TRAFFIC, METAVERSE APPLICATIONS,
AND METAVERSE CLIENT DEVICES

400

415

RECEIVE METAVERSE
CLASSIFICATION AND IDENTIFICATION
INFORMATION AND CLASSIFIED DATA
PACKETS

420

GENERATE A NETWORK-WIDE END-
TO-END METAVERSE TRAFFIC FLOW
PRIORITY ASSIGNMENT

430

PRIORITIZE METAVERSE CLIENT
DEVICES AND METAVERSE TRAFFIC
AT THE LINK-LEVEL OF METAVERSE
OPTIMIZATION AND PRIORITIZATION
ENABLED NETWORK

440

SELECT AN OPTIMUM NETWORK
CONFIGURATION FOR METAVERSE
TRAFFIC FLOW

450

OPTIMIZE A METAVERSE WIRELESS
LINK UTILIZED BY A METAVERSE
CLIENT DEVICE OF METAVERSE
OPTIMIZATION ENABLED NETWORK

470

MONITOR AND PERFORM ROOT
CAUSE ANALYSIS OF METAVERSE
OPTIMIZATION NETWORK AND APPLY
OPTIMIZATION SOLUTION IF
NECESSARY

FIG. 4

META VERSE OPTIMIZATION AND PRIORITIZATION SYSTEM AND METHOD THEREFOR

BACKGROUND

WiFi networks are increasingly being utilized to access the metaverse and metaverse applications. Head-mounted devices (HMDs) connect to WiFi networks in order to allow users of the HMDs to access the metaverse. However, because accessing the metaverse requires high-throughput and extreme low-latency for its underlying WiFi network, many users of HMDs take issue with WiFi networks not providing the necessary capabilities to minimize the effects of congestion on the WiFi networks. Given that a majority of users of HMDs utilize WiFi networks to access the metaverse, it is crucial that the effects of bottlenecks that exist over the WiFi networks be rectified. Therefore, a need exists to ameliorate the effects of congestion in WiFi networks in order to improve the overall user experience in the metaverse.

SUMMARY

The Summary provided herein is utilized to introduce a selection of concepts in a simplified form that are further described below in the Detailed Description. The Summary is not intended to identify key features or essential features of the claimed subject matter, nor is the Summary intended to be used to limit the scope of the claimed subject matter.

Methods, systems, and computer readable mediums that store code for performing methods are described herein. In one aspect, a system includes a metaverse optimization and prioritization enabled cloud-based controller. In some embodiments, the metaverse optimization and prioritization enabled cloud-based controller includes a metaverse traffic classification unit; and a metaverse optimization and prioritization unit, wherein based upon the identification of data packets as metaverse data packets, the metaverse optimization and prioritization unit optimizes and prioritizes a metaverse client device and metaverse traffic associated with a metaverse optimization and prioritization enabled network. In some embodiments, the metaverse optimization and prioritization unit optimizes the metaverse client device based upon a quality of experience associated with the metaverse client device. In some embodiments, the metaverse optimization and prioritization unit prioritizes the metaverse traffic based on quality of service management features ascertained utilizing the metaverse optimization and prioritization enabled cloud-based controller.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

FIG. 4 illustrates a metaverse optimization and prioritization method in accordance with some embodiments.

DETAILED DESCRIPTION

Figure 1:
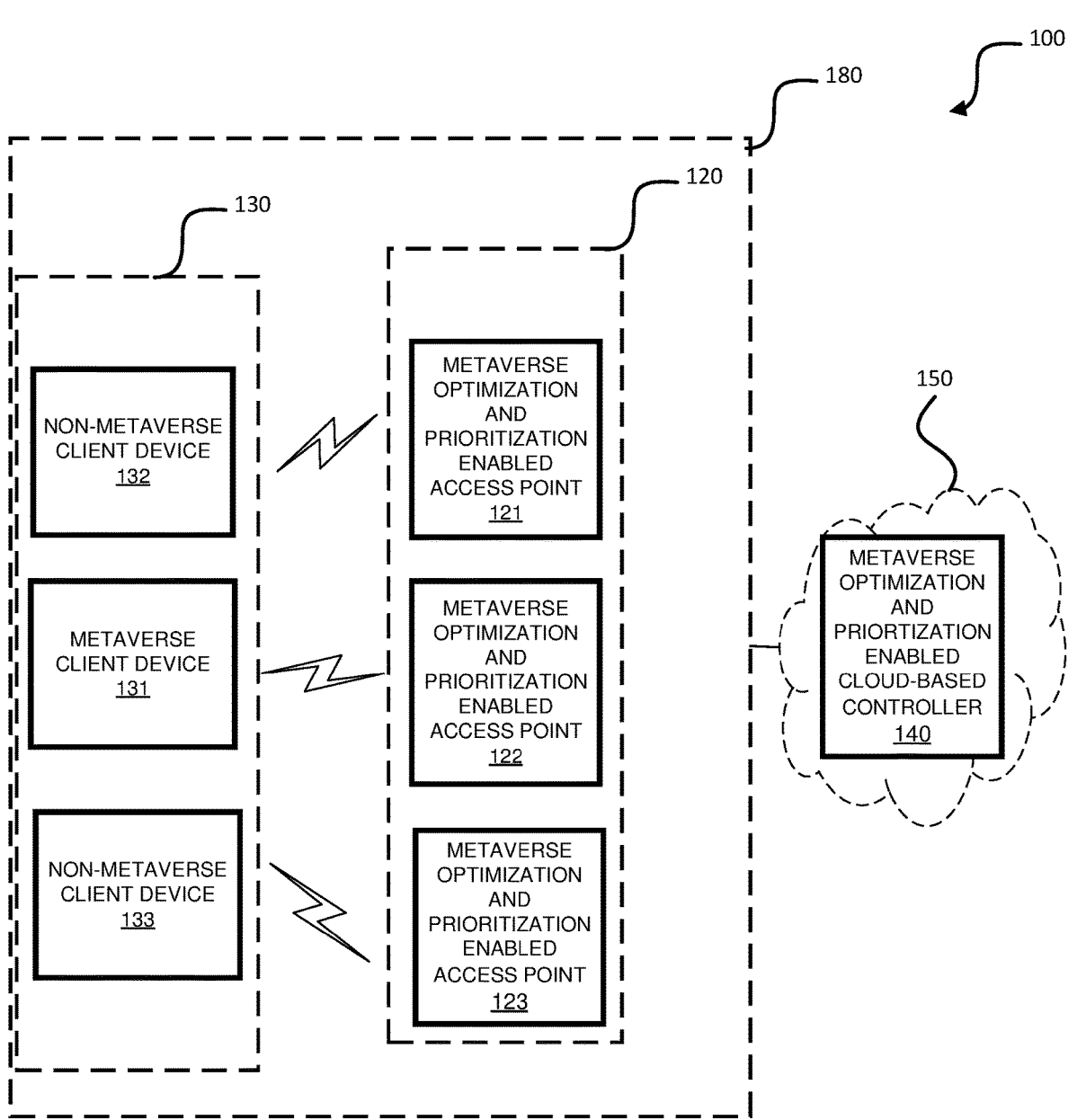
FIG. 1 illustrates a block diagram of a metaverse optimization and prioritization enabled network in accordance with some embodiments.

FIG. 1 illustrates a metaverse optimization and prioritization enabled network 100 in accordance with some embodiments. In some embodiments, metaverse optimization and prioritization enabled network 100 is a metaverse optimization and prioritization enabled network configured to utilize a metaverse optimization and prioritization enabled cloud-based controller 140 in cloud 150 to perform metaverse optimization and prioritization operations to optimize and prioritize metaverse traffic, metaverse applications, and/or metaverse client devices of WiFi network 180 in metaverse optimization and prioritization enabled network 100 as described herein.

In some embodiments, metaverse optimization and prioritization enabled network 100 includes a WiFi network 180 coupled to a cloud 150 that is configured to provide access to a metaverse for a user of a metaverse client device of client devices 130. In some embodiments, WiFi network 180 includes client devices 130 and metaverse optimization and prioritization enabled access points 120. In some embodiments, cloud 150 includes, in addition to traditional cloud components that allow a metaverse client device of client devices 130 to access the metaverse via WiFi network 180, a metaverse optimization and prioritization enabled cloud-based controller 140.

In some embodiments, client devices 130 are computerized communication devices (e.g., smartphones, laptops, smartwatches, smart tablets, smart TVs, HMDs, etc.) configured to allow users of the client devices to utilize metaverse optimization and prioritization enabled access points 120 to access WiFi network 180 and cloud 150 of metaverse optimization and prioritization enabled network 100. In some embodiments, client devices 130 includes a metaverse client device 131, a non-metaverse client device 132, and a non-metaverse client device 133. In some embodiments, non-metaverse client device 132 and non-metaverse client device 133 are client devices that are configured to allow non-metaverse WiFi access to users of the non-metaverse client devices using WiFi network 180 of metaverse optimization and prioritization enabled network 100. In some embodiments, non-metaverse client device 132 and non-metaverse client device 133 may be, for example, laptops, smartphones, smartTVs, desktops, servers, etc., or other non-metaverse client devices.

In some embodiments, metaverse client device 131 is a client device configured to allow a user of metaverse client device 131 to access the metaverse utilizing a metaverse optimization and prioritization enabled access point of WiFi network 180. In some embodiments, metaverse client device 131 may be, for example, a head mounted device (HMD) configured to allow a user of the HMD to access the metaverse using a metaverse optimization and prioritization enabled access point of metaverse optimization and prioritization enabled access points 120 of WiFi network 180. In some embodiments, metaverse client device 131 includes a metaverse application 181, a metaverse application 182, and a metaverse application 183. In some embodiments, a metaverse application is a software application that is configured to operate in a metaverse or metaverse environment provided by, for example, metaverse optimization and prioritization enabled network 100. In some embodiments, metaverse application 181, metaverse application 181, and metaverse application 181, are software applications utilized by metaverse client device 131 that are configured to allow metaverse client device 131 to gain access to or operate in the metaverse or metaverse environment provided using metaverse optimization and prioritization enabled network 100. In some embodiments, the client devices 130 are wirelessly coupled to the metaverse optimization and prioritization enabled access point 121 of metaverse access via metaverse optimization and prioritization enabled network 100.

In some embodiments, metaverse optimization and prioritization enabled access points 120 includes a metaverse optimization and prioritization enabled access point 121, a metaverse optimization and prioritization enabled access point 122, and a metaverse optimization and prioritization enabled access point 123. In some embodiments, metaverse optimization and prioritization enabled access points 120 may include additional or fewer metaverse optimization and prioritization enabled access points depending on whether, for example, the WiFi network 180 is a residential WiFi network or an enterprise WiFi network. In some embodiments, metaverse optimization and prioritization enabled access points 120, are access points that, in addition to being configured to perform general access point operations, are configured to identify and classify traffic flow (e.g., network data packets), software applications, and client devices of client devices 130 as either non-metaverse data packets or metaverse data packets, non-metaverse applications or metaverse applications, and/or non-metaverse client devices or metaverse client devices, respectively. In some embodiments, a metaverse data packet is a network data packet that is configured to be utilized to access and operate in the metaverse or metaverse environment provided by metaverse optimization and prioritization enabled network 100 using, for example, metaverse client device 131. In some embodiments, a non-metaverse data packet is a network data packet that is not configured to be utilized to operate in the metaverse or metaverse environment provided by metaverse optimization and prioritization enabled network 100. In some embodiments, a metaverse application is a software application that is configured to operate in the metaverse or metaverse environment provided by metaverse optimization and prioritization enabled network 100 using, for example, metaverse client device 131. In some embodiments, metaverse optimization and prioritization enabled access points 120 are configured to provide the metaverse classification and identification information to metaverse optimization and prioritization enabled cloud-based controller 140 for further processing.

In some embodiments, metaverse optimization and prioritization enabled cloud-based controller 140 is executable code that, in addition to being configured to perform general cloud controller operations for metaverse optimization and prioritization enabled network 100, is configured to perform metaverse optimization and prioritization operations at cloud 150 to optimize and prioritize metaverse traffic, metaverse applications, and/or metaverse client devices in metaverse optimization and prioritization enabled network 100 as described further herein. In some embodiments, by utilizing metaverse optimization and prioritization enabled cloud-based controller 140 to perform metaverse optimization and prioritization operations at cloud 150, users of the metaverse enabled network 100 experience less latency and disruptions of service that serves as an indication of improvement over other traditional WiFi networks and associated computing systems.

Figure 2:
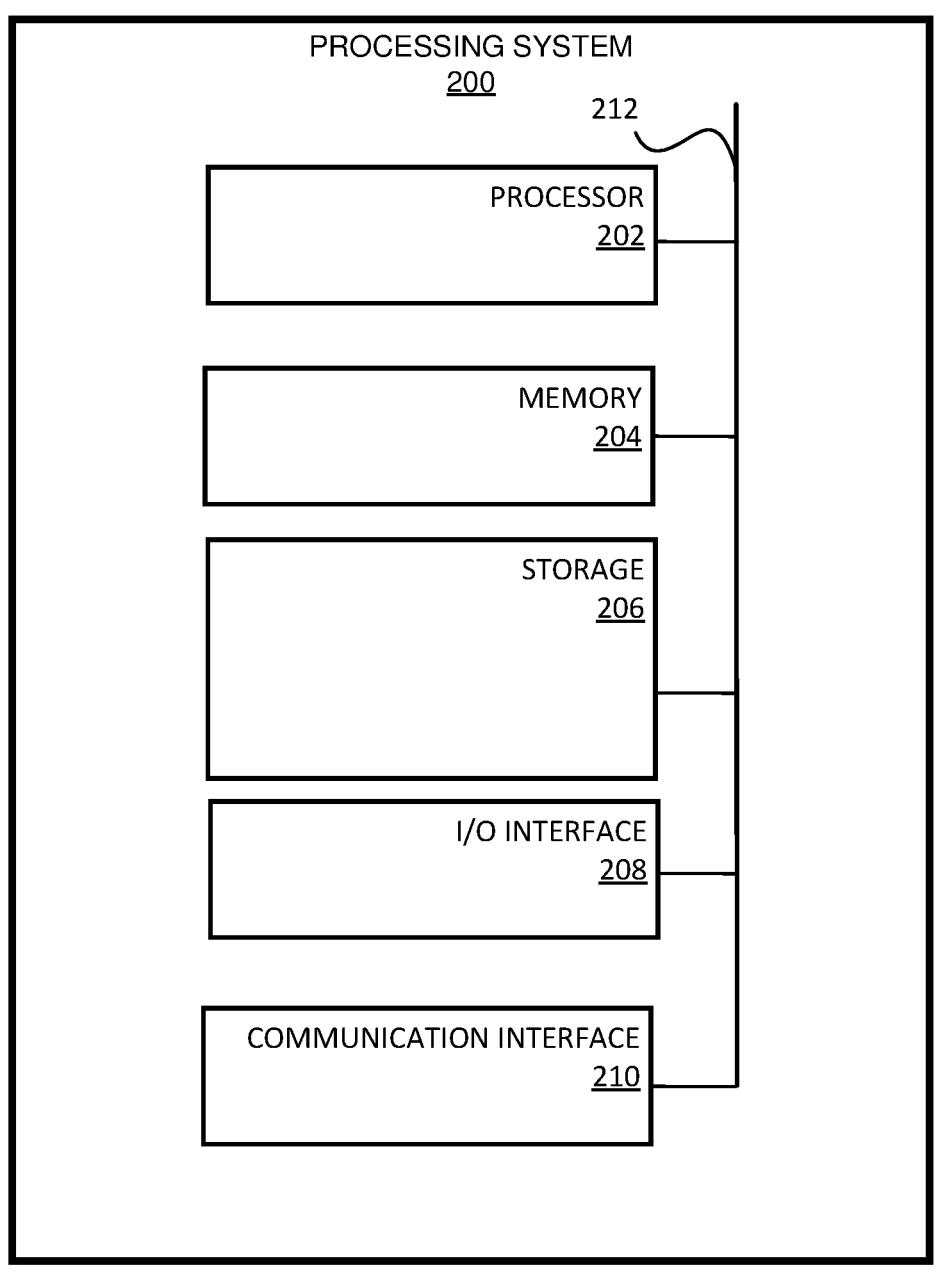
FIG. 2 illustrates a block diagram of a processing system that may be utilized in the metaverse optimization and prioritization enabled network of FIG. 1 in accordance with some embodiments.

FIG. 2 illustrates an example processing system 200 of metaverse enabled network 100 in accordance with some embodiments. In some embodiments, one or more processing systems 200 may perform one or more steps of one or more methods or operations described or illustrated herein. In particular embodiments, one or more processing systems 200 provide functionality described or illustrated herein. In particular embodiments, software running on one or more processing systems 200 performs one or more steps of one or more methods described or illustrated herein or provides functionality described or illustrated herein. Particular embodiments include one or more portions of one or more processing systems 200. Herein, reference to a computer system may encompass a computing device, and vice versa, where appropriate. Moreover, reference to a computer system may encompass one or more computer systems, where appropriate.

This disclosure contemplates any suitable number of processing systems 200. This disclosure contemplates processing system 200 taking any suitable physical form. As example and not by way of limitation, processing system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, processing system 200 may include one or more processing systems 200; be unitary or distributed; span multiple locations; span multiple machines; span multiple data centers; or reside in a cloud, such as, for example, cloud 150, which may include one or more cloud components in one or more networks. Where appropriate, one or more processing systems 200 may perform without substantial spatial or temporal limitation one or more steps of one or more methods described or illustrated herein. As an example and not by way of limitation, one or more processing systems 200 may perform in real time or in batch mode one or more steps of one or more methods described or illustrated herein. One or more processing systems 200 may perform at different times or at different locations one or more steps of one or more methods described or illustrated herein, where appropriate.

In some embodiments, processing system 200 includes a processor 202, memory 204, storage 206, an input/output (I/O) interface 208, a communication interface 210, and a bus 212. In some embodiments, the processing system described herein may be considered a computer system. Although this disclosure describes and illustrates a particular computer system having a particular number of particular components in a particular arrangement, this disclosure contemplates any suitable computer system having any suitable number of any suitable components in any suitable arrangement.

In some embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In some embodiments, memory 204 includes main memory for storing instructions for processor 202 to execute or data for processor 202 to operate on. As an example and not by way of limitation, processing system 200 may load instructions from storage 206 or another source (such as, for example, another processing system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In some embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to processing system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 106. Although this disclosure describes and illustrates particular storage, this disclosure contemplates any suitable storage.

In some embodiments, I/O interface 208 includes hardware, software, or both, providing one or more interfaces for communication between processing system 200 and one or more I/O devices. Processing system 200 may include one or more of these I/O devices, where appropriate. One or more of these I/O devices may enable communication between a person and processing system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. In some embodiments, I/O devices may include a camera configured to digitally capture images. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

As an example and not by way of limitation, processing system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, processing system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In some embodiments, bus 212 includes hardware, software, or both coupling components of processing system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

As described herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, secure digital cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

As an example and not by way of limitation, communication interface 210 may include a network interface controller (NIC) or network adapter for communicating with an Ethernet or other wire-based network or a wireless NIC (WNIC) or wireless adapter for communicating with a wireless network. Processing system 200 may include any suitable communication interface 210 configured to perform some of the embodiments described herein for any of these networks, where appropriate. Communication interface 210 may include one or more communication interfaces, where appropriate. In some embodiments, communication interface 210 includes hardware, software, or both providing one or more interfaces for communication (such as, for example, packet-based communication) between processing system 200 and processing system 200, and one or more other processing systems or one or more networks.

Figure 3A:
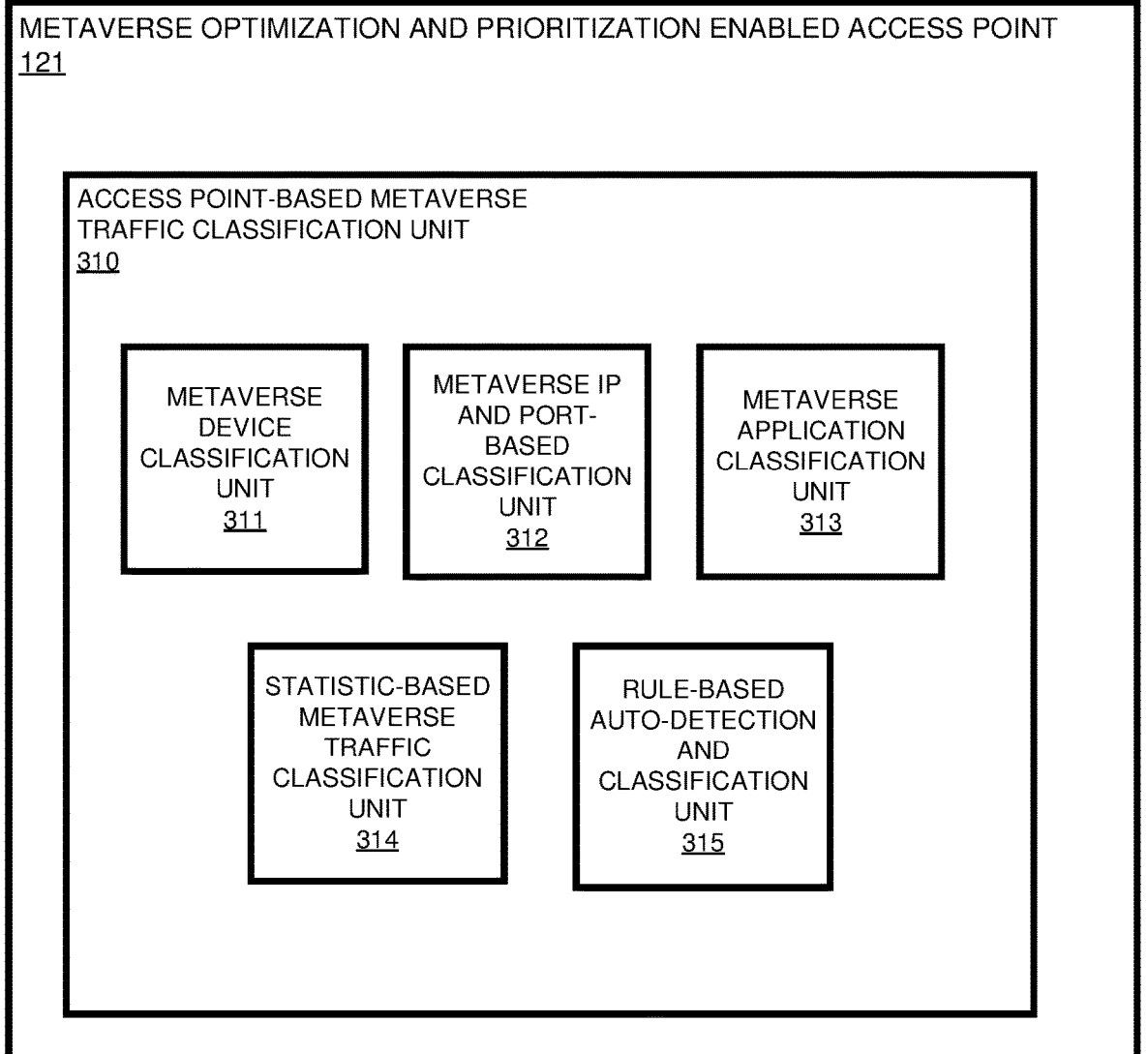
FIG. 3A illustrates a block diagram of a metaverse optimization and prioritization enabled access point of the metaverse optimization and prioritization enabled network of FIG. 1 in accordance with some embodiments.

FIG. 3A illustrates a block diagram of a metaverse optimization and prioritization enabled access point 121 of the metaverse optimization and prioritization enabled network 100 of FIG. 1 in accordance with some embodiments. In some embodiments, as stated previously, metaverse optimization and prioritization enabled access point 121 (and likewise metaverse optimization and prioritization enabled access point 122 and metaverse optimization and prioritization enabled access point 123) is an access point that, in addition to being configured to perform general access point operations, is configured to identify and classify traffic flow (e.g., network data packets) received from, for example, client devices 130, as either non-metaverse data packets or metaverse data packets, identify and classify applications as either non-metaverse applications or metaverse applications, and/or identify and classify client devices as either non-metaverse client devices or metaverse client devices for optimization and prioritization of metaverse traffic, metaverse applications, and/or metaverse client devices by metaverse optimization and prioritization enabled cloud-based controller 140 of cloud 150. In some embodiments, metaverse optimization and prioritization enabled access point

121 provides the metaverse classification and identification information as metadata (and the associated classified data packets) to metaverse optimization and prioritization enabled cloud-based controller 140 for optimization and prioritization of metaverse traffic, metaverse applications, and metaverse client devices in metaverse optimization and prioritization enabled network 100.

In some embodiments, metaverse optimization and prioritization enabled access point 121 includes, in addition to the traditional access point components that allow WiFi connectivity and/or metaverse connectivity to client devices 130 via cloud 150, an access point-based metaverse traffic classification unit 310. In some embodiments, access point-based metaverse traffic classification unit 310 is executable code configured to identify and classify traffic flow (e.g., network data packets) received from, for example, client devices 130, as either non-metaverse data packets or metaverse data packets, identify and classify applications as either non-metaverse applications or metaverse applications, and/or identify and classify client devices as either non-metaverse client devices or metaverse client devices. In some embodiments, access point-based metaverse traffic classification unit 310 provides the metaverse classification and identification information as metadata to metaverse optimization and prioritization enabled cloud-based controller 140 for optimization and prioritization of metaverse traffic and metaverse client devices in metaverse optimization and prioritization enabled network 100.

In some embodiments, access point-based metaverse traffic classification unit 310 includes a metaverse device classification unit 311, a metaverse internet protocol (IP) and port-based classification unit 312, a metaverse application classification unit 313, a statistic-based metaverse traffic classification unit 314, and/or a rule-based auto-detection and classification unit 315. In some embodiments, metaverse device classification unit 311, metaverse IP and port-based classification unit 312, metaverse application classification unit 313, statistic-based metaverse traffic classification unit 314, and/or rule-based auto-detection and classification unit 315 are collectively configured to identify and classify client devices of client devices 130, applications operating in metaverse optimization and prioritization enabled network 100, and data packets received from client devices 130 such that the metaverse classification and identification information and the identified and classified traffic may be utilized by metaverse optimization and prioritization unit 360 of metaverse optimization and prioritization enabled cloud-based controller 140 to optimize the performance of a metaverse client device 131 (e.g., HMD).

In some embodiments, metaverse device classification unit 311 is executable code configured to identify and classify a client device of client devices 130 of WiFi network 180 as a metaverse client device and/or a non-metaverse client device. In some embodiments, metaverse device classification unit 311 identifies and classifies a client device of client devices 130 as a metaverse client device and/or a non-metaverse client device by performing a traffic flow assessment of the traffic flow being received by the metaverse optimization and prioritization enabled access point 121. For example, in some embodiments, metaverse device classification unit 311 identifies and classifies a client device of client devices 130 as a metaverse client device and/or a non-metaverse client device by assessing a media access control (MAC) address (or MAC OUI for non-MAC randomized devices) in received data packets from the client device of client devices 130. In some embodiments, metaverse device classification unit 311 utilizes the MAC address to classify the traffic flow received at metaverse optimization and prioritization enabled access point 121 as either non-metaverse data packets (e.g., non-metaverse traffic) or metaverse data packets (e.g., metaverse traffic).

In some embodiments, metaverse device classification unit 311 may include a level 2 (L2) classifier that is utilized to identify and/or classify network traffic based on L2 attributes of an Open Systems Interconnection (OSI) model, such as, for example, MAC addresses, ethernet frames, VLAN tags, or other L2 characteristics of network data packets. In some embodiments, by performing the traffic flow assessment of the received data packets from client devices 130 utilizing, for example, the MAC address, the metaverse device classification unit 311 is configured to identify and classify traffic flows and the corresponding client devices and provide the metaverse classification and identification information (via metadata) and classified data packets to metaverse optimization and prioritization enabled cloud-based controller 140 for metaverse traffic and metaverse client device optimization and prioritization in metaverse optimization and prioritization enabled network 100.

In some embodiments, metaverse internet protocol (IP) and port-based classification unit 312 is executable code configured to utilize IP and port information from the data packets received from client devices 130 to classify traffic flow as either metaverse traffic or non-metaverse traffic. In some embodiments, metaverse IP and port-based classification unit 312 classifies the traffic flow as either metaverse traffic or non-metaverse traffic by performing an IP/port assessment of the data packets received from a client device of client devices 130. In some embodiments, the IP/port data includes information that indicates that the traffic flow is either non-metaverse traffic or metaverse traffic. In some embodiments, metaverse IP and port-based classification unit 312 may include, for example, a level 4 (L4) classifier that is utilized to identify and classify data packets based on L4 attributes found at the transport layer of OSI. In some embodiments, the L4 attributes may be, for example, source and destination port numbers, which may be used to identify specific applications or services using associated ports. In some embodiments, the applications that access the metaverse enabled network 100 via metaverse optimization and prioritization enabled access point 121 may utilize varying port numbers for communication, such that in examining the port numbers in the headers of packets, the L4 classifier may determine which application or service the traffic flow is associated with. In some embodiments, after identifying and classifying the traffic flow, the metaverse classification and identification information (via metadata) and classified data packets may be provided to metaverse optimization and prioritization enabled cloud-based controller 140 for metaverse traffic, metaverse application, and metaverse client device optimization and prioritization.

In some embodiments, metaverse application classification unit 313 is executable code configured to identify and classify applications executing on client devices 130 as either metaverse applications or non-metaverse applications. In some embodiments, metaverse application classification unit 313 identifies and classifies applications as either metaverse applications or non-metaverse applications by performing an assessment of metadata received in the traffic flow associated with the applications provided to metaverse optimization and prioritization enabled access point 121. In some embodiments, the metaverse application classification unit 313 may include a level 7 (L7) classifier which categorizes or classifies network traffic based on attributes found at the application layer. In some embodiments, the L7 classifier may be configured to identify and classify metaverse applications, services, or protocols being utilized in metaverse optimization and prioritization enabled network 100. For example, in some embodiments, metaverse application classification unit 313 assesses the metadata by capturing and decoding the metadata that represents port numbers and L4 and L7 signatures (e.g., MPEG-DASH SRD in https). In some embodiments, the metadata decoded by metaverse application classification unit 313 indicates whether an application is a metaverse application or non-metaverse application. In some embodiments, the resulting metaverse classification and identification information and classified data packets are provided to metaverse optimization and prioritization enabled cloud-based controller 140 for optimization and prioritization of the identified and classified metaverse applications in metaverse optimization and prioritization enabled network 100.

In some embodiments, statistic-based metaverse traffic classification unit 314 is executable code configured to identify and classify data packets received at metaverse optimization and prioritization enabled access point 121 as either metaverse data packets or non-metaverse data packets based on data packet statistics. In some embodiments, the data packet statistics include, for example, packet length, inter-arrival rate, instantaneous throughput, etc. In some embodiments, statistic-based metaverse traffic classification unit 314 may utilize artificial intelligence and/or machine learning techniques, such as, for example, linear regression, decision trees, etc., to perform the identification and classification and train the decision rules/thresholds pre-assigned labels. In some embodiments, the resulting metaverse classification and identification information and classified data packets may be provided to metaverse optimization and prioritization enabled cloud-based controller 140 for metaverse traffic optimization and prioritization in metaverse optimization and prioritization enabled network 100.

In some embodiments, rule-based auto-detection and classification unit 315 is executable code configured to automatically detect (auto-detect) or identify and classify traffic flow provided to the metaverse optimization and prioritization enabled access point 121. In some embodiments, rule-based auto-detection and classification unit 315 is configured to classify data packets as either metaverse data packets or non-metaverse data packets based on a device ID and/or reference to a virtual reality (VR) application provided in the data packets. In some embodiments, in order to identify the traffic flow received by the metaverse optimization and prioritization enabled access point 121, the rule-based auto-detection and classification unit 315 utilizes metaverse classification signatures in the data packets. In some embodiments, rule-based auto-detection and classification unit 315 is configured to generate a metaverse set of rules based on the signatures in order to perform the classification and automatically detect (auto-detect) the metaverse traffic. In some embodiments, the metaverse-set of rules are a set of rules that indicate, for example, which data packets are metaverse data packets and their associated priority level. In some embodiments, the metaverse-set of rules may be provided to metaverse optimization and prioritization enabled cloud-based controller 140 for metaverse traffic optimization and prioritization. In some embodiments, the metaverse classification and identification information and classified data packets are provided to metaverse optimization and prioritization enabled cloud-based controller 140 for metaverse traffic optimization and prioritization in metaverse optimization and prioritization enabled network 100.

Figure 3B:
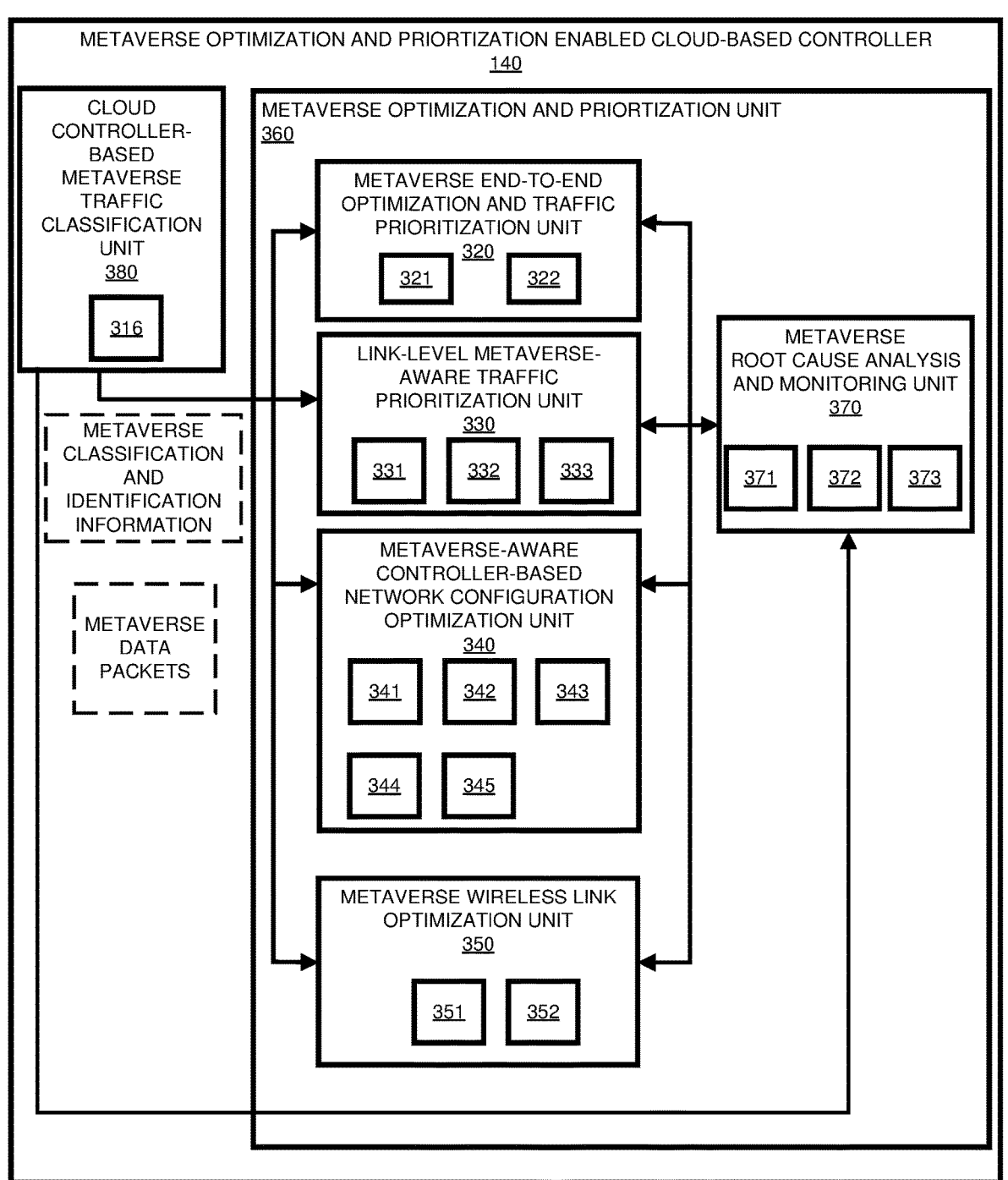
FIG. 3B illustrates a block diagram of a metaverse optimization and prioritization enabled cloud controller of FIG. 1 in accordance with some embodiments.

FIG. 3B illustrates a block diagram of metaverse optimization and prioritization enabled cloud-based controller 140 of FIG. 1 in accordance with some embodiments. In some embodiments, as stated previously, metaverse optimization and prioritization enabled cloud-based controller 140 is executable code that, in addition to being configured to perform general cloud controller operations for metaverse optimization and prioritization enabled network 100, is configured to perform metaverse optimization and prioritization operations (such as, for example, metaverse optimization and prioritization method 400 of FIG. 4) at cloud 150 to optimize and prioritize metaverse traffic, metaverse applications, and/or metaverse client devices in metaverse optimization and prioritization enabled network 100.

In some embodiments, metaverse optimization and prioritization enabled cloud-based controller 140 includes a cloud controller-based metaverse traffic classification unit 380 and a metaverse optimization and prioritization unit 360. In some embodiments, cloud controller-based metaverse traffic classification unit 380 and metaverse optimization and prioritization unit 360 are collectively configured to optimize and prioritize metaverse traffic, metaverse patent applications, and/or metaverse client devices in metaverse optimization and prioritization enabled network 100, thereby optimizing the user experience of the metaverse provided via the metaverse optimization and prioritization enabled network 100.

In some embodiments, cloud controller-based metaverse traffic classification unit 380 is executable code configured to perform identification and classification of metaverse data packets, metaverse applications, and/or metaverse client devices at metaverse optimization and prioritization enabled cloud-based controller 140. In some embodiments, cloud controller-based metaverse traffic classification unit 380 is configured to perform identification and classification operations similar to those described with reference to access point-based metaverse traffic classification unit 310, except that, for example, data packets are received, identified, and classified at the cloud controller-based metaverse traffic classification unit 380, instead of at access point-based metaverse traffic classification unit 310. For example, in some embodiments, similar to access point-based metaverse traffic classification unit 310, cloud controller-based metaverse traffic classification unit 380 may include a metaverse device classification unit, a metaverse internet protocol (TP) and port-based classification unit, a metaverse application classification unit, a statistic-based metaverse traffic classification unit, and/or a rule-based auto-detection and classification unit as described with reference to FIG. 3A.

In some embodiments, cloud controller-based metaverse traffic classification unit 380 may also include a telemetry-based classification unit 316. In some embodiments, telemetry-based classification unit 316 is executable code configured to identify and classify data packets as either metaverse data packets or non-metaverse data packets, identify and classify applications as either non-metaverse applications or metaverse applications, and/or identify a client device of client devices 130 as either a metaverse client device or a non-metaverse client device based on telemetry information associated with the client devices 130 and/or metaverse optimization and prioritization enabled access points 120. For example, in some embodiments, metaverse device classification unit 311 identifies and classifies a client device of client devices 130 as a metaverse client device and/or a non-metaverse client device by performing a telemetry information assessment of the telemetry information associated with client devices 130 and/or metaverse optimization and prioritization enabled access points 120 provided from metaverse optimization and prioritization enabled access points 120. In some embodiments, the telemetry information assessed by the telemetry-based classification unit 316 is located in management frames and beacon frames of the data packets transmitted from the metaverse optimization and prioritization enabled access points 120. In some embodiments, the metaverse classification and identification information generated by the cloud controller-based metaverse traffic classification unit 380 and the classified data packets are provided to the metaverse optimization and prioritization enabled cloud-based controller 140 to optimize and prioritize metaverse traffic, metaverse applications, and/or metaverse client devices in metaverse optimization and prioritization enabled network 100. In some embodiments, the metaverse classification and identification information generated by the cloud controller-based metaverse traffic classification unit 380 is provided in metadata to the metaverse optimization and prioritization enabled cloud-based controller 140.

In some embodiments, metaverse optimization and prioritization unit 360 is executable code configured to utilize the metaverse classification and identification information (received from cloud controller-based metaverse traffic classification unit 380 and/or access point-based metaverse traffic classification unit 310) and the identified classified metaverse data packets to perform the metaverse-based optimization and prioritization operations described herein. In some embodiments, the metaverse optimization and prioritization unit 360 includes a metaverse end-to-end optimization and traffic prioritization unit 320, a link-level metaverse-aware traffic prioritization unit 330, a metaverse-aware controller-based network configuration optimization unit 340, a metaverse wireless link optimization unit 350, and a metaverse root cause analysis and monitoring unit 370. In some embodiments, the metaverse end-to-end optimization and traffic prioritization unit 320, the link-level metaverse-aware traffic prioritization unit 330, the metaverse-aware controller-based network configuration optimization unit 340, the metaverse wireless link optimization unit 350, and the metaverse root cause analysis and monitoring unit 370 are collectively configured to optimize and prioritize the metaverse traffic, metaverse applications, and/or metaverse client devices based on, for example, the metaverse classification and identification information provided from cloud controller-based metaverse traffic classification unit 380 and/or access point-based metaverse traffic classification unit 310.

In some embodiments, metaverse end-to-end optimization and traffic prioritization unit 320 is executable code configured to generate a network-wide end-to-end metaverse traffic flow priority assignment that is utilized to prioritize metaverse traffic in metaverse optimization and prioritization enabled network 100 and optimize a QoE of a metaverse client device of client devices 130 in metaverse optimization and prioritization enabled network 100. In some embodiments, a network-wide end-to-end metaverse traffic flow priority assignment is a priority assignment that, utilizing, for example, quality of service (QoS) management feature unit 321 and/or dynamic tagging unit 322, places priority of metaverse traffic network-wide such that the network may be optimized for metaverse traffic, metaverse applications, and metaverse client devices of client devices 130. In some embodiments, metaverse end-to-end optimization and traffic prioritization unit 320 includes a QoS management feature unit 321 and a dynamic tagging unit 322. In some embodiments, QoS management feature unit

321 and dynamic tagging unit 322 are collectively config-ured to generate the network-wide end-to-end metaverse traffic flow priority assignment to optimize a QoE of a metaverse client device of client devices 130 across meta-verse optimization and prioritization enabled network 100.

In some embodiments, the QoS management feature unit 321 is executable code configured to utilize QoS manage-ment features to generate a network-wide end-to-end meta-verse traffic flow priority assignment that prioritizes meta-verse traffic across metaverse optimization and prioritization enabled network 100. In some embodiments, QoS manage-ment feature unit 321 assigns priority to metaverse traffic by performing a QoS management feature assessment of the IP header of received metaverse data packets for QoS manage-ment features, and assigning priority to the received meta-verse data packets based on the QoS management feature assessment.

In some embodiments, the QoS management feature assessment is a QoS management feature assessment that includes a client-centric QoS management feature assess-ment and/or a network-centric QoS management feature assessment. For example, as part of the QoS management feature assessment, QoS management feature unit 321 may assess the QoS management features of the metaverse traffic as being client-centric QoS management features (such as, for example, stream service classification service (SCS) and/or mirrored stream classification service (MSCS)) or network-centric QoS management features (such as, for example, Differentiated Services Code Point (DSCP) map-ping). In some embodiments, when QoS management fea-ture unit 321 assesses the QoS management feature as a client-centric QoS management feature, QoS management feature unit 321 may assign the metaverse traffic with a higher priority in the network-wide end-to-end metaverse traffic flow priority assignment compared to non-metaverse traffic. Similarly, in some embodiments, when QoS man-agement feature unit 321 assesses the metaverse traffic as a network-centric QoS management feature, QoS manage-ment feature may assign the metaverse traffic with a higher priority in the network-wide end-to-end metaverse traffic flow priority assignment compared to non-metaverse traffic. In some embodiments, by utilizing of the QoS management features in the QoS management feature assessment, QoS management feature unit 321 is configured to enable meta-verse optimization and prioritization enabled access points 120 and metaverse enabled client devices of client devices 130 to negotiate and/or request specific IP metaverse traffic flows (identified using, for example, the QoS management features in the IP header of the metaverse traffic) to be given priority and be assigned to particular user priorities and access categories.

In some embodiments, by utilizing the client-centric QoS management features, QoS management feature unit 321 is configured to enable the metaverse enabled clients of meta-verse optimization and prioritization enabled network 100 to provide QoS guidance (in the form of, for example, QoS guidance notifications) to partner metaverse optimization and prioritization enabled access points of metaverse opti-mization and prioritization enabled access points 120 by requesting other metaverse optimization and prioritization enabled access points to apply specific client-centric QoS treatment (e.g., client-centric QoS management feature treatment) for selected downlink IP metaverse traffic flows using, for example, IP classifiers or QoS mirroring.

In some embodiments, by utilizing of network-centric QoS management features, QoS management feature unit 321 is configured to enable a metaverse optimization enabled access point to request a metaverse client device in client devices 130 and/or metaverse optimization and pri-oritization enabled access points 120 to apply specific net-work-centric QoS treatment (e.g., network-centric QoS management feature treatment) for selected uplink IP meta-verse traffic flows in metaverse optimization and prioritiza-tion enabled network 100. In some embodiments, QoS management feature unit 321 may assign priority to meta-verse traffic based on network-centric QoS management features to utilize a DSCP policy to assist in aligning network-centric QoS management feature treatment of metaverse traffic across metaverse optimization and priori-tization enabled network 100.

In some embodiments, a benefit and improvement pro-vided by utilizing QoS management feature unit 321 of metaverse optimization and prioritization enabled network 100 over other network systems includes better user expe-riences with real-time applications, reduced latency, preven-tion of outages in emerging immersive applications, and reduced lag time in access to interactive cloud and edge services. For example, in some embodiments, utilization of QoS management features by QoS management feature unit 321 assists in delivering consistent, end-to-end QoS treat-ment, thereby facilitating robust service delivery and higher quality experiences with latency-sensitive metaverse appli-cations.

In some embodiments, dynamic tagging unit 322 is executable code configured to dynamically tag metaverse traffic flow (e.g., data packets identified as metaverse data packets) for use in generating a network-wide end-to-end metaverse traffic flow priority assignment of metaverse traffic across the entire metaverse optimization and priori-tization enabled network 100. In some embodiments, dynamic tagging unit 322 dynamically tags metaverse traffic flow by performing a dynamic tagging assessment of dynamic tagging criteria of the metaverse traffic (e.g., an assessment of metaverse data packets that indicates whether metaverse data packets are critical data packets), and tagging the identified metaverse data packets with, for example, DSCP tagging for a proper handling of per hop DSCP. In some embodiments, dynamic tagging criteria may be criteria utilized to determine whether metaverse traffic is critical metaverse traffic. In some embodiments, dynamic tagging criteria may be, for example, a latency budget associated with the metaverse traffic, where metaverse optimization and prioritization unit 360 may be configured to, as part of the dynamic tagging assessment, utilize the latency budget to determine whether metaverse traffic flow is close to a latency budget edge. For example, in some embodiments, when, as part of the dynamic tagging assessment of dynamic tagging criteria, dynamic tagging unit 322 determines that metaverse traffic flow has been identified as approaching the edge of its latency budget (e.g., latency budget edge), dynamic tagging unit 322 may dynamically tag the meta-verse traffic flow to increase the prioritization of the meta-verse traffic flow by modifying the network-wide end-to-end metaverse traffic flow priority assignment (e.g., by tuning a DSCP to a type of service (TOS) mapping such that the metaverse traffic flow is mapped to a higher priority while transiting through metaverse optimization and prioritization enabled network 100). In some embodiments, dynamic tagging may be based on, for example, proper handling of per hop DSCP. In some embodiments, the dynamic tagging unit 322 utilizes the dynamic application of DSCP tagging to metaverse traffic flows in order to ensure that the end-to-end throughput, latency, and jitter requirements of the meta-verse traffic are met and an optimal QoE is achieved compared to traditional networks. In some embodiments, the dynamically tagged metaverse data packets tagged by dynamic tagging unit 322 are provided to and subsequently processed by cloud 150 to optimize the metaverse optimization and prioritization enabled network 100 according to the network-wide end-to-end metaverse traffic flow priority assignment in metaverse optimization and prioritization enabled network 100.

In some embodiments, link-level metaverse-aware traffic prioritization unit 330 is executable code configured to prioritize metaverse client devices and metaverse traffic at the link-level (e.g., WiFi link) of metaverse optimization and prioritization enabled network 100. In some embodiments, the link-level metaverse-aware traffic prioritization unit 330 includes a metaverse detection-based telemetry WiFi multimedia (WMM) feature configuration unit 331, a QoS-aware scheduling and queue length optimization unit 332, and a metaverse detection-based client steering unit 333. In some embodiments, link-level metaverse-aware traffic prioritization unit 330 utilizes the metaverse detection-based telemetry WMM feature configuration unit 331, the QoS-aware scheduling and queue length optimization unit 332, and/or the metaverse detection-based client steering unit 333 to prioritize metaverse client devices and/or metaverse traffic for a user of metaverse client device 131 in metaverse optimization and prioritization enabled network 100.

In some embodiments, metaverse detection-based telemetry WMM feature configuration unit 331 is executable code configured to utilize telemetry information associated with client devices 130 and/or metaverse optimization and prioritization enabled access points 120 to prioritize metaverse client devices and metaverse traffic flows over a Wi-Fi link in WiFi network 180 of metaverse optimization and prioritization enabled network 100. In some embodiments, metaverse detection-based telemetry WMM feature configuration unit 331 prioritizes metaverse client devices and metaverse traffic flows by performing a telemetry assessment of telemetry information (e.g., traffic characteristics and/or other types of characteristics) associated with client devices 130 and/or metaverse optimization and prioritization enabled access points 120, and based on the results of the telemetry assessment, dynamically configuring a metaverse-based WMM user priority of a metaverse-based user priority framework and/or an access category to be assigned for the metaverse traffic flows and metaverse client devices.

In some embodiments, a metaverse-based WMM user priority framework is a user priority framework that, in addition to including traditional WMM user priorities, such as, for example, a voice user priority, a video user priority, a best effort user priority, and a background user priority, includes a metaverse user priority to specifically prioritize metaverse traffic, metaverse applications, and/or metaverse client devices. In some embodiments, the metaverse user priority is a user priority that is assigned, for example, a highest priority in the metaverse-based WMM user priority framework. For example, in some embodiments, utilizing the telemetry information assessed utilizing during the telemetry assessment by metaverse detection-based telemetry WMM feature configuration unit 331, metaverse traffic may be dynamically assigned by metaverse detection-based telemetry WMM feature configuration unit 331 to a highest priority level and non-metaverse traffic of the best effort class may be assigned by metaverse detection-based telemetry WMM feature configuration unit 331 to a mid-level priority level or lowest priority level. In some embodiments, utilizing the metaverse detection-based telemetry WMM feature configuration unit 331, link-level metaverse-aware traffic prioritization unit 330 may thereby dynamically control a prioritization level of metaverse client devices and metaverse traffic flow based on telemetry information associated with metaverse optimization and prioritization enabled access points 120.

In some embodiments, metaverse detection-based telemetry WMM feature configuration unit 331 may also be configured to tune WMM feature parameters, such as, for example, contention window sizes, inter-frame spacing, and medium hold times, to control a prioritization level of metaverse client devices and metaverse traffic flow. In some embodiments, metaverse detection-based telemetry WMM feature configuration unit 331 may further tune WMM feature parameters to control medium access priority provided to the metaverse traffic flows. In some embodiments, use of the metaverse detection-based telemetry WMM feature configuration unit 331 to tune the WMM feature parameters leads to improvements in the latency and jitter performance of the metaverse traffic flows over network systems that do not utilize the metaverse optimization and prioritization enabled cloud-based controller 140. In some embodiments, by utilizing the metaverse detection-based telemetry WMM feature configuration unit 331, link-level metaverse-aware traffic prioritization unit 330 reduces a queuing delay and medium access latency experienced by metaverse traffic flows compared to traditional WiFi networks.

In some embodiments, QoS-aware scheduling and queue length optimization unit 332 is executable code configured to schedule metaverse traffic and optimize a queue length associated with the metaverse traffic in metaverse optimization and prioritization enabled network 100. In some embodiments, a queue length associated with the metaverse traffic refers to a number of data packets that are held in a buffer or queue located at a metaverse client device or a metaverse optimization and prioritization enabled access point to be transmitted over a wireless link of WiFi network 180. In some embodiments, QoS-aware scheduling and queue length optimization unit 332 optimizes a queue length associated with the metaverse traffic by performing a QoS-aware assessment of incoming traffic (e.g., packet statistics), priorities of metaverse traffic flows, total shared capacity of queues, and/or channel characteristics (e.g., contention, data rate, etc.), and scheduling metaverse traffic and optimizing a queue length associated with the metaverse traffic based on QoS-aware assessment. For example, in some embodiments, when metaverse traffic has been identified by cloud controller-based metaverse traffic classification unit 380 and/or access point-based metaverse traffic classification unit 310, a queue length for the metaverse traffic may be enlarged to buffer the associated metaverse data packets such that packet drops are prevented and minimal latency associated with the metaverse traffic is guaranteed, thereby generating an optimized queue length for the metaverse traffic.

In some embodiments, QoS-aware scheduling and queue length optimization unit 332 is configured to map metaverse traffic to varying priority levels, each of which may be utilized by QoS-aware scheduling and queue length optimization unit 332 to model as a queue in firmware. In some embodiments, QoS-aware scheduling and queue length optimization unit 332 schedules metaverse traffic by utilizing the optimized queue length ascertained by the QoS-aware scheduling and queue length optimization unit 332. For example, in some embodiments, QoS-aware scheduling and queue length optimization unit 332 utilizes the optimized queue length for maximum-weight scheduling such that dynamic queue control may be optimized and the QoS may be improved and guaranteed.

In some embodiments, metaverse detection-based client steering unit 333 is executable code configured to optimize a metaverse optimization enabled access point and/or a radio frequency (RF) band for use by a metaverse client device (e.g., a client device running a metaverse application or generating a metaverse traffic flow) based on metaverse traffic detection in metaverse optimization and prioritization enabled network 100. In some embodiments, metaverse detection-based client steering unit 333 optimizes a metaverse optimization enabled access point and/or a radio frequency band for use by a metaverse client device by determining the metaverse clients devices and metaverse data packets that have been identified as such by cloud controller-based metaverse traffic classification unit 380 and/or access point-based metaverse traffic classification unit 310, performing a centralized metaverse optimization and prioritization enabled cloud-based cloud controller assessment of metaverse optimization and prioritization enabled cloud-based cloud controller information, and prioritizing the metaverse client devices and metaverse data packets based on the results of the centralized metaverse optimization and prioritization enabled cloud-based cloud controller assessment.

In some embodiments, metaverse detection-based client steering unit 333 performs the centralized metaverse optimization and prioritization enabled cloud-based cloud controller assessment by comparing metaverse optimization and prioritization enabled cloud-based cloud controller information, such as, for example, load information, demand information, and client received signal strength indicators (RSSIs) on the available basic service sets (BSSs) to metaverse optimization and prioritization enabled cloud-based cloud controller information thresholds. In some embodiments, the metaverse optimization and prioritization enabled cloud-based cloud controller information thresholds are thresholds that equate to optimality criteria of the metaverse environment required by the metaverse optimization and prioritization enabled cloud-based controller 140. In some embodiments, when metaverse detection-based client steering unit 333 determines that the metaverse optimization and prioritization enabled cloud-based cloud controller information meets the metaverse optimization and prioritization enabled cloud-based cloud controller information thresholds, the metaverse detection-based client steering unit 333 prioritizes metaverse client devices and metaverse data packets in WiFi network 180 and matches the metaverse device clients to the appropriate RF band and the metaverse optimization and prioritization enabled access points 120 that have been optimized by the metaverse detection-based client steering unit 333.

In some embodiments, utilization of the metaverse detection-based client steering unit 333 serves as an improvement over traditional WiFi networks because metaverse detection-based client steering unit 333 utilizes information that client devices generally do not have access to perform metaverse optimization and prioritization operations. That is, the metaverse optimization and prioritization enabled cloud-based controller 140 (which is centralized) is privy to information, such as, for example, load information, demand information, and client RSSIs on all available BSSs, that is utilized to perform metaverse optimization and prioritization operations. In some embodiments, utilizing the link-level metaverse-aware traffic prioritization unit 330, metaverse optimization and prioritization enabled cloud-based controller 140 is configured to perform global optimization for metaverse client devices, metaverse applications, and/or metaverse traffic flows in an extended service set (ESS).

In some embodiments, metaverse-aware controller-based network configuration optimization unit 340 is executable code configured to select (or be utilized in the selection of) an optimum network configuration for metaverse traffic flow in metaverse optimization and prioritization enabled network 100. In some embodiments, metaverse-aware controller-based network configuration optimization unit 340 includes an optimum channel and bandwidth selection unit 341, a mesh configuration optimization unit 342, a coloring optimization unit 343, a bandwidth adaptation unit 344, and/or a dynamic frequency selection (DFS) channel configuration unit 345. In some embodiments, metaverse-aware controller-based network configuration optimization unit 340 utilizes optimum channel and bandwidth selection unit 341, mesh configuration optimization unit 342, coloring optimization unit 343, bandwidth adaptation unit 344, and/or DFS channel configuration unit 345 in the selection of an optimum network configuration for metaverse traffic flow of metaverse optimization and prioritization enabled network 100.

In some embodiments, optimum channel and bandwidth selection unit 341 is executable code configured to select an optimum channel and an optimum bandwidth for metaverse traffic flow in metaverse optimization and prioritization enabled network 100. In some embodiments, optimum channel and bandwidth selection unit 341 selects an optimum channel and an optimum bandwidth by performing an access point congestion level assessment of traffic flow (e.g., metaverse traffic flow and non-metaverse traffic flow) and adjusting a bandwidth and/or channel selection based upon the access point congestion level assessment. For example, in some embodiments, when the access point congestion level assessment performed by optimum channel and bandwidth selection unit 341 indicates that the congestion level is at a low level, traffic flows identified as metaverse traffic flows by cloud controller-based metaverse traffic classification unit 380 or access point-based metaverse traffic classification unit 310 are dynamically reassigned to a channel or a band identified by optimum channel and bandwidth selection unit 341 as an optimal channel or optimum band (e.g., a channel or band experiencing low level congestion and/or low level interference). In some embodiments, the optimum bandwidth is the bandwidth associated with the optimum band selected by the optimum channel and bandwidth selection unit 341.

In some embodiments, optimum channel and bandwidth selection unit 341 selects an optimum channel and an optimum bandwidth by performing a signal strength assessment of WiFi signals received by metaverse optimization and prioritization enabled access points associated with the traffic flow (e.g., metaverse traffic flow and non-metaverse traffic flow) and adjusting a bandwidth and/or channel selection based upon the signal strength assessment. For example, in some embodiments, when, as a result of a signal strength assessment, optimum channel and bandwidth selection unit 341 determines that a signal strength associated with a metaverse client device is below a metaverse signal strength threshold (e.g., lower than a metaverse optimum signal strength), optimum channel and bandwidth selection unit 341 dynamically reassigns the metaverse client device to use a lower channel bandwidth selected by optimum channel and bandwidth selection unit 341, thereby improving the reliability of the metaverse traffic flows in metaverse optimization and prioritization enabled network 100 compared to other networks or systems. In some embodiments, utilization of optimal channel and bandwidth selection unit 341 yields a significant reduction in latency and jitter for the metaverse traffic flow (by, for example, reducing the number of collisions and packet retransmissions).

In some embodiments, mesh configuration optimization unit 342 is executable code configured to optimize a mesh configuration (e.g., a WiFi mesh configuration) of metaverse optimization and prioritization enabled access points for metaverse traffic and/or metaverse client devices in metaverse optimization and prioritization enabled network 100. In some embodiments, mesh configuration optimization unit 342 optimizes a mesh configuration by determining the metaverse clients devices and/or metaverse data packets that have been identified as such by cloud controller-based metaverse traffic classification unit 380 and/or access point-based metaverse traffic classification unit 310, performing an optimal channel set assessment and/or an optimal set of transmission power level assessment of the metaverse optimization and prioritization enabled access points 120, and selecting the metaverse optimization and prioritization enabled access points of metaverse optimization and prioritization enabled access points 120 that map to the optimal set of channels and/or the optimal set of transmission power levels that may be utilized for the metaverse client devices and/or metaverse traffic flow. In some embodiments, the mesh configuration optimized by mesh configuration optimization unit 342 may be, for example, a mesh configuration optimized for maximal coverage (e.g., a maximal coverage optimized mesh configuration) or a mesh configuration optimized for minimal interference (e.g., a minimal interference mesh configuration). In some embodiments, depending on the application of WiFi network 180, such as, for example, an enterprise application or a residential application, optimization of a mesh configuration may be based on either maximal coverage of a metaverse optimization enabled access point or minimal interference at the metaverse optimization enabled access point.

For example, in some embodiments, when the optimal channel set assessment and/or the optimal set of transmission power level assessment of the metaverse optimization and prioritization enabled access points 120 performed by mesh configuration optimization unit 342 indicates that specific metaverse optimization and prioritization enabled access points of metaverse optimization and prioritization enabled access points 120 are optimal for the metaverse client device and/or metaverse traffic, mesh configuration optimization unit 342 selects the optimal metaverse optimization and prioritization enabled access points of metaverse optimization and prioritization enabled access points 120 as the optimal mesh configuration (e.g., a minimal interference mesh configuration or performance optimal mesh configuration). In some embodiments, for example, when metaverse client devices are active in WiFi network 180 of metaverse optimization and prioritization enabled network 100 (e.g., metaverse traffic flow has been detected associated with the metaverse client devices), the mesh configuration selected by mesh configuration optimization unit 342 may be a performance optimal mesh configuration. In some embodiments, based on, for example, the metaverse traffic classification and metaverse client device classification by access point-based metaverse traffic classification unit 310 and/or cloud controller-based metaverse traffic classification unit 380, the optimality of mesh configurations obtained utilizing mesh configuration optimization unit 342 may be dynamically adjusted. In some embodiments, when metaverse client devices are not active in WiFi network 180 of metaverse optimization and prioritization enabled network 100 (e.g., metaverse traffic flow has not been detected), the mesh configuration selected by mesh configuration optimization unit 342 may be a maximal coverage optimized mesh configuration (e.g., not optimized for metaverse clients or metaverse traffic).

In some embodiments, mesh configuration optimization unit 342 may be utilized in a heterogeneous network of metaverse optimization and prioritization enabled access points in WiFi network 180. In some embodiments, use of mesh configurations generated using mesh configuration optimization unit 342 results in reduced latencies and improved throughputs in metaverse optimization and prioritization enabled network 100.

In some embodiments, coloring optimization unit 343 is executable code configured to perform optimal coloring operations for metaverse optimization and prioritization enabled network 100. In some embodiments, with reference to WiFi network 180, a coloring operation is an operation in which a distinct "color" or identifier is assigned to a wireless channel in WiFi network 180 to minimize or prevent interference and optimize channel allocation for metaverse client devices and metaverse optimization and prioritization enabled access points. In some embodiments, coloring optimization unit 343 performs coloring operations by performing an interference assessment of interference measurements ascertained at metaverse optimization and prioritization enabled access points 120, and based on the results of the interference assessment of the interference measurements ascertained at the metaverse optimization and prioritization enabled access points 120, selecting optimal BSS colors for the wireless channels utilized by metaverse client devices of the metaverse optimization and prioritization enabled access points 120. For example, when the interference assessment performed by coloring optimization unit 343 indicates that interference is above an optimal metaverse interference threshold, coloring optimization unit 343 selects optimal BSS colors for the wireless channels utilized by metaverse client devices of the metaverse optimization and prioritization enabled access points 120. In some embodiments, the optimal BSS coloring performed by coloring optimization unit 343 may be utilized by the metaverse optimization and prioritization enabled cloud-based controller 140 to dictate and define the manner in which metaverse optimization and prioritization enabled access points 120 operate in transmitting metaverse traffic in the presence of interference.

In some embodiments, coloring optimization unit 343 operates as a unified control of multiple access points (metaverse optimization and prioritization enabled access points 120) by using, for example, knowledge of the locations of the metaverse optimization and prioritization enabled access points in metaverse optimization and prioritization enabled access points 120, and assigns optimal BSS colors accordingly.

In some embodiments, a coloring scheme may be generated by coloring optimization unit 343 for mesh configurations even in the presence of, for example, rogue access points in metaverse optimization and prioritization enabled access points 120. In some embodiments, coloring optimization unit 343 may also be used to identify the optimal interference thresholds for a given physical distribution of metaverse optimization and prioritization enabled access points 120 which may be utilized to provide efficient use of the spectrum in metaverse optimization and prioritization enabled network 100 with less back-off time leading to lower latencies.

In some embodiments, bandwidth adaptation unit 344 is executable code configured to adapt a bandwidth utilized for metaverse traffic flow based on a signal strength of transmission signals utilized to transmit the metaverse traffic flow from metaverse client device in metaverse optimization and prioritization enabled network 100. In some embodiments, bandwidth adaption unit 344 performs bandwidth adaption by assessing signal strength power measurements (of the transmission signals utilized to transmit metaverse traffic) ascertained at, for example, a metaverse optimization enabled access point of metaverse optimization and prioritization enabled network 100 and, based on the result of the signal strength assessment, selecting an optimal bandwidth for transmission of the metaverse traffic from the metaverse client device. In some embodiments, a root cause analysis of the root cause of a reduction in signal strength of transmission signals utilized to transmit the metaverse traffic may be used to select an optimal bandwidth for transmission of the metaverse traffic.

In some embodiments, DFS channel configuration unit 345 is executable code configured to assist a metaverse optimization enabled access point in tracking radar activity in WiFi network 180 to allow the metaverse optimization enabled access point to dynamically select a DFS channel to include as part of an optimum network configuration for metaverse traffic flow in metaverse optimization and prioritization enabled network 100. In some embodiments, the radar activity tracked by DFS channel configuration unit 345 may be from, for example, weather radar activity or military radar activity. In some embodiments, DFS channel configuration unit 345 assists a metaverse optimization enabled access point in tracking radar activity by performing a radar reports assessment of radar reports from other metaverse optimization and prioritization enabled access points of metaverse optimization and prioritization enabled access points 120, utilizing the radar reports assessment to generate a DFS channel selection list, and providing the DFS channel selection list to metaverse optimization and prioritization enabled access points 120 for appropriate selection of a DFS channel for the optimum network configuration. In some embodiments, a radar report refers to information provided by a metaverse optimization and prioritization enabled access point about the presence of radar signals in the vicinity of the metaverse optimization and prioritization enabled access point. In some embodiments, the radar report includes information such as, for example, the frequency of the detected radar signal, the duration of the detected radar signal, and signal strength of the detected radar signal. In some embodiments, a radar report is generated by the metaverse optimization and prioritization enabled access point when a metaverse optimization and prioritization enabled access point detects a radar signal. In some embodiments, the DFS channel selection list is a list that includes an allow list (e.g., white list) of DFS channels that may be selected by a metaverse optimization enabled access point for the optimum network configuration and a deny list (e.g., black list) of DFS channels that may not be selected by the metaverse optimization enabled access point for the optimum network configuration.

In some embodiments, for a metaverse optimization and prioritization enabled network 100 with a single metaverse optimization enabled access point (such as, for example, metaverse optimization and prioritization enabled access point 121), the metaverse optimization enabled access point may collect historical DFS channel data to emphasize and/or deemphasize certain DFS channels on the DFS channel selection list. In some embodiments, use of the DFS channel configuration unit 345 by the metaverse optimization and prioritization enabled cloud-based controller 140 results in the metaverse optimization and prioritization enabled network 100 retaining a desired key performance indicator (KPI), e.g., where a KPI is a parameter value that is utilized to evaluate the performance and effectiveness of metaverse optimization and prioritization enabled network 100.

In some embodiments, metaverse wireless link optimization unit 350 is executable code configured to optimize a metaverse wireless link utilized by a metaverse client device in WiFi network 180 of metaverse optimization and prioritization enabled network 100. In some embodiments, metaverse wireless link optimization unit 350 includes an access point beamforming channel state information (CSI) collection unit 351 and a dynamic modulation and multipath transmission configuration unit 352. In some embodiments, a metaverse wireless link is a WiFi link between a metaverse client device of client devices 130 and a metaverse optimization enabled access point of metaverse optimization and prioritization enabled access points 120 of WiFi network 180.

In some embodiments, access point beamforming CSI collection unit 351 is executable code configured to optimize a metaverse wireless link in WiFi network 180 by enabling a metaverse optimization and prioritization enabled access point to collect CSI associated with a metaverse client device utilizing full access point antenna beamforming at the metaverse optimization and prioritization enabled access point. In some embodiments, access point beamforming CSI collection unit 351 enables a metaverse optimization and prioritiza+tion enabled access point to collect CSI associated with a metaverse client device utilizing full access point antenna beamforming by performing a multiple metaverse client device assessment of the client devices in client devices 130, and based on the metaverse client device assessment, triggering the metaverse optimization and prioritization enabled access point to enter a full access point antenna beamforming mode for transmission of metaverse traffic in WiFi network 180.

In some embodiments, as part of the full access point antenna beamforming mode, access point beamforming CSI collection unit 351 triggers a metaverse optimization and prioritization enabled access point of metaverse optimization and prioritization enabled access points 120 to switch from a first set of antennas in a set of multiple antennas on the metaverse optimization and prioritization enabled access point to a second set of antennas on the metaverse optimization and prioritization enabled access point to allow multi-client multiple beam communication with multiple client devices 130. In some embodiments, by utilizing access point beamforming CSI collection unit 351 to switch from the first set of antennas in the set of multiple antennas on the metaverse optimization and prioritization enabled access point to the second set of antennas on the metaverse optimization and prioritization enabled access point, metaverse optimization and prioritization enabled access point is able to have multi-client multiple beam communication with multiple client devices 130. In some embodiment s, access point beamforming CSI collection unit 351 is configured to enable a metaverse optimization and prioritization enabled access point of metaverse optimization and prioritization enabled access points 120 to create multiple beams towards multiple client devices of client devices 130 and collect CSIs individually from each metaverse client device.

In some embodiments, after the metaverse optimization and prioritization enabled access point has collected CSIs individually from each metaverse client device, access point beamforming CSI collection unit 351 gathers the CSIs for each metaverse client device of client devices 130 from each active metaverse optimization and prioritization enabled access point of metaverse optimization and prioritization enabled access points 120 and reconstructs the CSIs to generate a CSI matrix (e.g., a full CSI matrix). In some embodiments, the CSI matrix is provided to the metaverse optimization and prioritization enabled access point to optimize the wireless link associated with each metaverse client device by guiding the direction of metaverse transmission signals of the wireless links and improving the beamforming gain at the metaverse optimization and prioritization enabled access point.

In some embodiments, dynamic modulation and multipath transmission configuration unit 352 is executable code configured to adjust modulation and multipath transmission configurations for metaverse traffic and metaverse classic devices in metaverse optimization and prioritization enabled network 100. In some embodiments, dynamic modulation and multipath transmission configuration unit 352 adjusts modulation and multipath transmission configurations by determining whether traffic flow has been identified and classified as metaverse traffic and/or a client device of client devices 130 has been identified and classified as metaverse client device by cloud controller-based metaverse traffic classification unit 380 and/or access point-based metaverse traffic classification unit 310, and dynamically turning on/off modulation and multipath transmission based upon whether the traffic is metaverse traffic and/or the client device is a metaverse client device. For example, in some embodiments, when dynamic modulation and multipath transmission configuration unit 352 determines that cloud controller-based metaverse traffic classification unit 380 and/or access point-based metaverse traffic classification unit 310 has identified and classified traffic as metaverse traffic and/or the client device as a metaverse client device, dynamic modulation and multipath transmission configuration unit 352 may dynamically turn on/off Orthogonal Frequency Division Multiple Access (OFDMA) and/or Multi-User Multiple-Input Multiple-Output (MU-MIMO) based on the identification of metaverse traffic and/or metaverse client device, thereby implementing a dynamic OFDMA configuration and/or MU-MIMO configuration to optimize the associated wireless link of the metaverse client device and metaverse traffic in WiFi network 180 of metaverse optimization and prioritization enabled network 100.

In some embodiments, metaverse root cause analysis and monitoring unit 370 is executable code configured to perform root cause analysis and performance monitoring of metaverse performance issues in metaverse optimization and prioritization enabled network 100. In some embodiments, the metaverse root cause analysis and monitoring unit 370 includes a metaverse KPI analysis unit 371, a root cause analysis unit 372, and a metaverse packet probing unit 373. In some embodiments, the metaverse KPI analysis unit 371, the root cause analysis unit 372, and/or the metaverse packet probing unit 373 are collectively configured to perform a root cause analysis and performance monitoring in metaverse optimization and prioritization enabled network 100.

In some embodiments, metaverse KPI analysis unit 371 is executable code configured to track and analyze the performance of metaverse client devices, metaverse applications, and metaverse traffic in WiFi network 180 of metaverse optimization and prioritization enabled network 100. In some embodiments, metaverse KPI analysis unit 371 tracks and analyzes the performance of metaverse client devices, metaverse applications, and metaverse traffic in metaverse optimization and prioritization enabled network 100 by tracking metaverse-related KPIs (e.g., metaverse client device KPIs, metaverse application KPIs, and/or metaverse traffic KPIs), performing a KPI threshold assessment of the metaverse-related KPIs (e.g., comparing the metaverse-related KPIs to metaverse-related KPI thresholds to determine whether the metaverse-related KPIs adhere to the metaverse-related KPI thresholds), and providing the results of the KPI analysis to a visual display interface for visualization of the results of the KPI analysis.

In some embodiments, when metaverse KPI analysis unit 371 determines that metaverse client devices, metaverse applications, and/or metaverse traffic flow are not adhering to the metaverse-related KPI thresholds (e.g., metaverse client device KPI thresholds, metaverse application KPI thresholds, and/or metaverse traffic KPI thresholds), the metaverse KPI analysis unit 371 records and presents supporting metrics and statistics to a developer or user of the metaverse optimization and prioritization enabled cloud-based controller 140 to root cause and troubleshoot potential issues identified utilizing the metaverse KPI analysis unit 371. In some embodiments, when metaverse KPI analysis unit 371 determines that metaverse client devices, metaverse applications, and/or metaverse traffic flow are adhering to metaverse-related KPI thresholds, metaverse KPI analysis unit 371 provides the results of the KPI analysis to the visual display indicating that there are not any identified metaverse-related KPI performance issues. In some embodiments, the information provided by metaverse KPI analysis unit 371 via, for example, the visual display interface, may be utilized to ensure the health of the metaverse traffic and detect and rectify bottlenecks in metaverse optimization and prioritization enabled network 100.

In some embodiments, root cause analysis unit 372 is executable code configured to perform a root cause analysis of performance degradation in WiFi network 180 and provide optimization solutions for rectification of the performance degradation for the associated metaverse client device and/or metaverse optimization enabled access point of metaverse optimization and prioritization enabled network 100. In some embodiments, root cause analysis unit 372 performs a root cause analysis by continuously tracking metaverse-related KPIs to detect performance degradation, analyzing supporting statistics to determine a cause of the performance degradation, and applying and/or recommending a metaverse wireless link optimization solution to rectify the performance degradation. In some embodiments, the root cause analysis performed by root cause analysis unit 372 automates the process of performance degradation detection and resolution in metaverse optimization and prioritization enabled network 100. In some embodiments, utilizing the automated detection and resolution capability provided by root cause analysis unit 372 removes a need for manual intervention and reduces the amount of time required from problem occurrence to resolution to ensure seamless metaverse experiences for the user of a metaverse client device and thereby provide an improvement over traditional network systems.

In some embodiments, metaverse packet probing unit 373 is executable code configured to perform metaverse-specific packet probing of data packets received at a metaverse optimization enabled access point to optimize the performance of metaverse wireless links and metaverse client devices of the metaverse optimization and prioritization enabled network 100. In some embodiments, metaverse packet probing unit 373 performs the metaverse-specific packet probing operations for metaverse QoS characterization by triggering a metaverse optimization enabled access point in metaverse optimization and prioritization enabled access points 120 to transmit probing packets to metaverse packet probing unit 373 and measuring the sensitivity of metaverse configuration parameters. In some embodiments, for centralized metaverse QoS management, the metaverse packet probing unit 373 triggers the metaverse-specific probing packets to probe the performance of various metaverse QoS policies. In some embodiments, packet probing triggered by metaverse packet probing unit 373 of metaverse optimization and prioritization enabled cloud-based controller 140 allows the metaverse optimization enabled access point to transmit metaverse-specific probing packets to the metaverse optimization and prioritization enabled cloud-based controller 140 with, for example, different metaverse QoS policies to measure the sensitivity of various metaverse configuration parameters. In some embodiments, the metaverse configuration parameters may include, for example, DSCP tags, WMM user priority, CW sizing per access point, etc. In some embodiments, the sensitivity measured utilizing the metaverse packet probing unit 373 and metaverse configuration parameters aid in runtime metaverse QoS policy optimization of the metaverse optimization and prioritization enabled network 100.

FIG. 4 is a flow diagram illustrating a metaverse optimization and prioritization method 400 in accordance with some embodiments. In some embodiments, the metaverse optimization and prioritization method 400 is utilized by metaverse optimization and prioritization enabled cloud-based controller 140 of FIG. 3B to perform metaverse optimization and prioritization operations for metaverse optimization and prioritization enabled network 100. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments.

In some embodiments, at operation 410, cloud controller-based metaverse traffic classification unit 380 and/or access point-based metaverse traffic classification unit 310 identifies and classifies metaverse traffic, metaverse applications, and/or metaverse client devices. In some embodiments, the cloud controller-based metaverse traffic classification unit 380 and/or access point-based metaverse traffic classification unit 310 provides the metaverse classification and identification information to metaverse optimization and prioritization unit 360. In some embodiments, the cloud controller-based metaverse traffic classification unit 380 and/or access point-based metaverse traffic classification unit 310 provides the metaverse classification and identification information to each unit in metaverse optimization and prioritization unit 360.

In some embodiments, at operation 415, metaverse optimization and prioritization unit 360 receives metaverse classification and identification information from cloud controller-based metaverse traffic classification unit 380 and/or access point-based metaverse traffic classification unit 310 and the classified metaverse data packets. In some embodiments, each unit in metaverse optimization and prioritization unit 360 receives metaverse classification and identification information from cloud controller-based metaverse traffic classification unit 380 and/or access point-based metaverse traffic classification unit 310 and the classified metaverse data packets.

In some embodiments, at operation 420, metaverse end-to-end optimization and traffic prioritization unit 320 performs end-to-end metaverse traffic optimization and prioritization in metaverse optimization and prioritization enabled network 100. In some embodiments, metaverse end-to-end optimization and traffic prioritization unit 320 generates a network-wide end-to-end metaverse traffic flow priority assignment that is utilized to prioritize metaverse traffic in metaverse optimization and prioritization enabled network 100 and optimize a QoE of a metaverse client device of client devices 130 in metaverse optimization and prioritization enabled network 100. In some embodiments, metaverse end-to-end optimization and traffic prioritization unit 320 utilizes QoS management feature unit 321 and/or dynamic tagging unit 322 to perform the end-to-end metaverse traffic optimization and prioritization in metaverse optimization and prioritization enabled network 100.

In some embodiments, at operation 430, link-level metaverse-aware traffic prioritization unit 330 performs a link-level (e.g., WiFi link) prioritization of metaverse client devices and metaverse traffic of metaverse optimization and prioritization enabled network 100. In some embodiments, link-level metaverse-aware traffic prioritization unit 330 utilizes metaverse detection-based telemetry WMM feature configuration unit 331, QoS-aware scheduling and queue length optimization unit 332, and/or metaverse detection-based client steering unit 333 to perform the link-level prioritization of metaverse client devices and metaverse traffic of metaverse optimization and prioritization enabled network 100.

In some embodiments, at operation 440, metaverse-aware controller-based network configuration optimization unit 340 selects an optimum network configuration for metaverse traffic flow in metaverse optimization and prioritization enabled network 100. In some embodiments, metaverse-aware controller-based network configuration optimization unit 340 utilizes optimum channel and bandwidth selection unit 341, mesh configuration optimization unit 342, coloring optimization unit 343, bandwidth adaptation unit 344, and/or DFS channel configuration unit 345 to select the optimum network configuration for metaverse traffic flow in metaverse optimization and prioritization enabled network 100.

In some embodiments, at operation 450, metaverse wireless link optimization unit 350 optimizes a WiFi link utilized by a metaverse client device of metaverse optimization and prioritization enabled network 100. In some embodiments, metaverse wireless link optimization unit 350 utilizes access point beamforming CSI collection unit 351 and/or dynamic modulation and multipath transmission configuration unit 352 to optimize the WiFi link utilized by a metaverse client device of metaverse optimization and prioritization enabled network 100.

In some embodiments, at operation 470, metaverse root cause analysis and monitoring unit 370 monitors and performs a root cause analysis of metaverse optimization and prioritization enabled network 100 and optionally applies an optimization solution based on the results of the root cause analysis or apply an optimization solution. In some embodiments, the metaverse root cause analysis and monitoring unit 370 utilizes metaverse KPI analysis unit 371, root cause analysis unit 372, and metaverse packet probing unit 373 to monitor and perform a root cause analysis of metaverse optimization and prioritization enabled network 100 and optionally apply an optimization solution based on the results of the root cause analysis or apply an optimization solution.

In some embodiments, a computer-implemented method, includes receiving, at a processor, classification and identification information generated as a result of a metaverse traffic assessment of data packets originating from a client device wirelessly coupled to a WiFi network; and based on the result of the metaverse traffic assessment of data packets indicating that the data packets have been identified and classified as metaverse data packets, optimizing the WiFi network to prioritize a metaverse being accessed by the client device, the client device being identified as a metaverse client device.

In some embodiments, the computer-implemented method further includes, based on the identification and the classification of the data packets as the metaverse data packets, utilizing, at the processor, the metaverse data packets to optimize a quality of experience (QoE) associated with the metaverse.

In some embodiments, the computer-implemented method further includes, based on the identification and the classification of the data packets as the metaverse data packets, prioritizing, at the processor, the metaverse data packets above non-metaverse data packets in a network-wide end-to-end metaverse traffic flow priority assignment.

In some embodiments, the computer-implemented method further includes, based on the identification and the classification of the data packets as the metaverse data packets, dynamically configuring, at the processor, a Wi-Fi multimedia (WMM) user priority and access category to prioritize the metaverse client device above non-metaverse client devices and prioritize the metaverse data packets above non-metaverse data packets.

In some embodiments, the computer-implemented method further includes, based on the identification and the classification of the data packets as the metaverse data packets, selecting, at the processor, an optimum network configuration for metaverse traffic flow.

In some embodiments, the computer-implemented method further includes, based on the identification and the classification of the data packets as the metaverse data packets, optimizing a wireless link for the metaverse by triggering, from the processor, physical layer features associated with transmission of the metaverse data packets.

In some embodiments of the computer-implemented method, triggering the physical layer features associated with transmission of the metaverse data packets includes triggering, from the processor, an access point to switch to a channel state information (CSI) mode to allow for collection of CSI individually from the access point and additional access points that are wirelessly coupled to the WiFi network.

In some embodiments, the computer-implemented method further includes monitoring, at the processor, the WiFi network to identify metaverse performance degradation associated with the metaverse.

In some embodiments, the computer-implemented method further includes performing a root cause analysis of the metaverse performance degradation.

In some embodiments, the computer-implemented method further includes applying a metaverse optimization solution to address the metaverse performance degradation based on the root cause analysis.

In some embodiments, a system, includes a processor; and a non-transitory computer readable medium coupled to the processor, the non-transitory computer readable medium including code that: receives classification and identification information generated as a result of a metaverse traffic assessment of data packets originating from a client device wirelessly coupled to a WiFi network; and based on the classification and identification information indicating that the data packets have been identified and classified as metaverse data packets, optimizes the WiFi network to prioritize a metaverse being accessed by the client device, the client device being identified as a metaverse client device.

In some embodiments of the system, wherein the code, based on the identification and the classification of the data packets as the metaverse data packets, utilizes the metaverse data packets to optimize a quality of experience (QoE) associated with the metaverse.

In some embodiments of the system, wherein the code, based on the identification and the classification of the data packets as the metaverse data packets, prioritizes the metaverse data packets above non-metaverse data packets in a network-wide end-to-end metaverse traffic flow priority assignment.

In some embodiments of the system, wherein the code, based on the identification and the classification of the data packets as the metaverse data packets, dynamically configures a Wi-Fi multimedia (WMN) user priority and access category to prioritize the metaverse client device above non-metaverse client devices and prioritize the metaverse data packets above non-metaverse data packets.

In some embodiments of the system, wherein the code, based on the identification and the classification of the data packets as the metaverse data packets, selects an optimum network configuration for metaverse traffic flow.

In some embodiments of the system, wherein the code, based on the identification and the classification of the data packets as the metaverse data packets, optimizes a wireless link for the metaverse by triggering physical layer features associated with transmission of the metaverse data packets.

In some embodiments of the system, wherein the code, monitors the WiFi network to identify metaverse performance degradation associated with the metaverse; performs a root cause analysis of the metaverse performance degradation; and applies a metaverse optimization solution to address the metaverse performance degradation based on the root cause analysis.

In some embodiments, a cloud-based controller includes a metaverse traffic classification unit; and a metaverse optimization and prioritization unit, wherein based upon an identification and classification of data packets as metaverse data packets, the metaverse optimization and prioritization unit optimizes and prioritizes a metaverse client device and metaverse traffic associated with a metaverse optimization and prioritization enabled network.

In some embodiments of the cloud-based controller, the metaverse optimization and prioritization unit optimizes the metaverse client device based upon a quality of experience associated with the metaverse.

In some embodiments of the cloud-based controller, the metaverse optimization and prioritization unit prioritizes the metaverse traffic based on quality of service management features.

What is claimed is:

1. A computer-implemented method, comprising:

receiving, at a processor, classification and identification information generated as a result of a metaverse traffic assessment of data packets originating from a client device wirelessly coupled to a WiFi network;

based on the result of the metaverse traffic assessment of data packets indicating that the data packets have been identified and classified as metaverse data packets, optimizing the WiFi network to prioritize a metaverse being accessed by the client device, the client device being identified as a metaverse client device; and based on the identification and the classification of the data packets as the metaverse data packets, selecting, at the processor, an optimum network configuration for metaverse traffic flow, wherein selecting the optimum network configuration comprises selecting an optimum bandwidth and an optimum channel based at least in part on an access point congestion level.

2. The computer-implemented method of claim 1, further comprising:

based on the identification and the classification of the data packets as the metaverse data packets, utilizing, at the processor, the metaverse data packets to optimize a quality of experience (QoE) associated with the metaverse.

3. The computer-implemented method of claim 1, further comprising:

based on the identification and the classification of the data packets as the metaverse data packets, prioritizing, at the processor, the metaverse data packets above non-metaverse data packets in a network-wide end-to-end metaverse traffic flow priority assignment.

4. The computer-implemented method of claim 1, further comprising:

based on the identification and the classification of the data packets as the metaverse data packets, dynamically configuring, at the processor, a Wi-Fi multimedia (WMM) user priority and access category to prioritize the metaverse client device above non-metaverse client devices and prioritize the metaverse data packets above nonmetaverse data packets.

5. The computer-implemented method of claim 1, further comprising:

based on the identification and the classification of the data packets as the metaverse data packets, optimizing a wireless link for the metaverse by triggering, from the processor, physical layer features associated with transmission of the metaverse data packets.

6. The computer-implemented method of claim 5, wherein:

triggering the physical layer features associated with transmission of the metaverse data packets includes triggering, from the processor, an access point to switch to a channel state information (CSI) mode to allow for collection of CSI individually from the access point and additional access points that are wirelessly coupled to the WiFi network.

7. The computer-implemented method of claim 1, further comprising:

monitoring, at the processor, the WiFi network to identify metaverse performance degradation associated with the metaverse.

8. The computer-implemented method of claim 7, further comprising:

performing a root cause analysis of the metaverse performance degradation.

9. The computer-implemented method of claim 8, further comprising:

applying a metaverse optimization solution to address the metaverse performance degradation based on the root cause analysis.

10. A system, comprising:

a processor; and a non-transitory computer readable medium coupled to the processor, the non-transitory computer readable medium including code that:

receives classification and identification information generated as a result of a metaverse traffic assessment of data packets originating from a client device wirelessly coupled to a WiFi network;

based on the classification and identification information indicating that the data packets have been identified and classified as metaverse data packets, optimizes the WiFi network to prioritize a metaverse being accessed by the client device, the client device being identified as a metaverse client device; and based on the identification and the classification of the data packets as the metaverse data packets, selects an optimum network configuration for metaverse traffic flow, wherein selecting the optimum network configuration comprises selecting an optimum bandwidth and an optimum channel based at least in part on an access point congestion level.

11. The system of claim 10, wherein the code:

based on the identification and the classification of the data packets as the metaverse data packets, utilizes the metaverse data packets to optimize a quality of experience (QoE) associated with the metaverse.

12. The system of claim 11, wherein the code:

based on the identification and the classification of the data packets as the metaverse data packets, prioritizes the metaverse data packets above non-metaverse data packets in a network-wide end-to-end metaverse traffic flow priority assignment.

13. The system of claim 10, wherein the code:

based on the identification and the classification of the data packets as the metaverse data packets, dynamically configures a Wi-Fi multimedia (WMM) user priority and access category to prioritize the metaverse client device above non-metaverse client devices and prioritize the metaverse data packets above non-metaverse data packets.

14. The system of claim 10, wherein the code:

based on the identification and the classification of the data packets as the metaverse data packets, optimizes a wireless link for the metaverse by triggering physical layer features associated with transmission of the metaverse data packets.

15. The system of claim 10, wherein the code:

monitors the WiFi network to identify metaverse performance degradation associated with the metaverse;

performs a root cause analysis of the metaverse performance degradation; and applies a metaverse optimization solution to address the metaverse performance degradation based on the root cause analysis.

16. A cloud-based controller, comprising:

a metaverse traffic classification unit; and a metaverse optimization and prioritization unit, wherein based upon an identification and classification of data packets as metaverse data packets, the metaverse optimization and prioritization unit optimizes and prioritizes a metaverse client device and metaverse traffic associated with a metaverse optimization and prioritization enabled network, and selects an optimum network configuration for metaverse traffic flow, the optimum network configuration comprising an optimum bandwidth and an optimum channel selected based at least in part on an access point congestion level.

17. The cloud-based controller of claim 16, wherein:

the metaverse optimization and prioritization unit optimizes the metaverse client device based upon a quality of experience associated with the metaverse.

18. The cloud-based controller of claim 17, wherein:
the metaverse optimization and prioritization unit priori-
tizes the metaverse traffic based on quality of service
management features.

* * * * *